(12) United States Patent
de Montmorillon (10) Patent No.: US 6,516,123 B1
(45) Date of Patent: Feb. 4, 2003

(54) OPTICAL FIBER WITH LARGE EFFECTIVE CORE AREA AND HIGH CHROMATIC DISPERSION

(75) Inventor: Louis-Anne de Montmorillon, Paris (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/506,034

(22) Filed: Feb. 17, 2000

(30) Foreign Application Priority Data

Feb. 18, 1999 (FR) .............................. 99 02029

(51) Int. Cl.⁷ .................................. G02B 6/02
(52) U.S. Cl. ........................ 385/123; 385/127
(58) Field of Search .................. 385/123–128

(56) References Cited

U.S. PATENT DOCUMENTS 5,675,688 A    10/1997  Nouchi et al.
6,205,268 B1 *  3/2001  Chraplyvy et al. ......... 385/123
6,263,138 B1 *  7/2001  Sillard et al. ............... 385/123

FOREIGN PATENT DOCUMENTS

EP    0 779 524 A2    6/1997
EP    0 859 247 A2    8/1998
EP    0 883 002 A1   12/1998
WO    WO 98/04941     2/1998

* cited by examiner

*Primary Examiner*—Cassandra Spyrou
*Assistant Examiner*—Euncha Cherry
(74) *Attorney, Agent, or Firm*—Sughrue Mion, PLLC (57) ABSTRACT

An optical fiber is disclosed having, at a wavelength of 1 550 nm, an effective core area not less than 100 $\mu m^2$, a chromatic dispersion from 14 ps/(nm.km) to 21 ps/(nm.km) and good resistance to microcurvatures. The specifications of the fiber limit non-linear effects and provide sufficient transmitted power for transmission systems. A fiber optic transmission system using fiber of the above kind as line fiber is also disclosed.

10 Claims, 9 Drawing Sheets

FIG-2

FIG_3

FIG_4

FIG_5

FIG_6

FIG_7

FIG_8

FIG-9

OPTICAL FIBER WITH LARGE EFFECTIVE CORE AREA AND HIGH CHROMATIC DISPERSION

BACKGROUND OF THE INVENTION

1. Field of the Invention

The present invention concerns fiber optic transmission.

2. Description of the Prior Art

The index profile of optical fibers is generally qualified by the shape of the graph of the function relating the radius of the fiber to the refractive index. The distance r to the center of the fiber is conventionally plotted on the abscissa axis and the difference between the refractive index and that of the fiber cladding on the ordinate axis. The expressions "step", "trapezium" and "triangle" are therefore used in referring to the shapes of profiles with graphs which are respectively step-shaped, trapezium-shaped and triangular. The curves are generally representative of the theoretical or set point profile of the fiber and fiber fabrication constraints can result in a significantly different profile.

In modern high bit rate wavelength-division multiplex transmission systems it is advantageous to manage chromatic dispersion, especially for bit rates of 10 Gbit/s and above per channel. The objective is to obtain substantially zero cumulative chromatic dispersion over the link for all values of the wavelength of the multiplex, in order to limit the widening of pulses. A cumulative value of a few hundreds of ps/nm for the dispersion is acceptable. It is also beneficial to avoid zero values of chromatic dispersion for the wavelengths used in the system, for which non-linear effects are greater. Finally, it is also beneficial to limit the chromatic dispersion slope over the range of the multiplex to avoid or limit distortion between the channels of the multiplex.

Stepped index fiber is conventionally used as line fiber in fiber optic transmission systems. For example, the ASMF 200 monomode stepped index fiber has a chromatic dispersion cancellation wavelength $\lambda_0$ in the range from 1 300 nm to 1 320 nm and a chromatic dispersion of 3.5 ps/(nm.km) in a range from 1 285 nm to 1 330 nm and 17 ps/(nm.km) at 1 550 nm. The chromatic dispersion slope at 1 550 nm is about 0.056 ps/(nm$^2$.km). The fiber has an effective core area of about 80 $\mu$m$^2$.

Dispersion shifted fibers (DSF) have also appeared on the market. In such fibers there is substantially zero chromatic dispersion at the transmission wavelength at which they are used, which is generally different from the 1.3 $\mu$m wavelength for which silica has substantially zero dispersion. Thus the non-zero chromatic dispersion of the silica is compensated (hence the use of the term "shifted") by an increase in the index difference $\Delta n$ between the fiber core and the optical cladding. The index difference shifts the wavelength at which there is zero chromatic dispersion. It is obtained by introducing dopants into the preform during its fabrication, for example by an MCVD process known in the art and not described in detail here.

Non-zero dispersion shifted fibers (NZ-DSF) have non-zero chromatic dispersion at the wavelengths at which they are used. Such fibers have a low chromatic dispersion at these wavelengths, typically less than 6 ps/(nm.km) at 1 550 nm.

One example of such fibers is disclosed in French patent application 98 12431 filed Oct. 5, 1998, whose title in translation is "Large effective core area shifted dispersion monomode optical fiber" and which describes a fiber having a large effective core area, typically greater than 100 $\mu$m$^2$. The chromatic dispersion of the fiber in the above application at 1 550 nm is about 8 ps/(nm.km).

It is known that non-linear effects decrease as the effective core area of the fiber increases. In "A new design for dispersion shifted fiber with an effective core area larger than 100 $\mu$m$^2$ and good bending characteristics", ThK1, OFC'98 Technical Digest, M. Kato et al. explain that non-linear effects in the fibers could become the dominant limitations on capacity and transmission distance for long-haul high-capacity amplified transmission systems. The above document indicates that one possible solution is to increase the effective core area of the fibers, to obtain a higher power and a greater interval between repeaters. The above document proposes a fiber having a coaxial profile, surrounded by a pedestal, with an effective core area of 146 $\mu$m$^2$ and a chromatic dispersion cancellation wavelength $\lambda_0$ of 1 500 nm. The chromatic dispersion at 1 550 nm is low and the chromatic dispersion slope at this wavelength is 0.09 ps/(nm$^2$.km).

U.S. Pat. No. 5,675,690 proposes a monomode optical fiber whose core has a central part with an index lower than that of the cladding, a ring having an index higher than that of the cladding, and a composite ring having a part with an index lower than that of the cladding and a part with an index higher than that of the cladding. In the above document the effective core area is about 85 $\mu$m$^2$ and chromatic dispersion is cancelled at a wavelength of about 1 550 nm. The fiber is a DSF in the sense defined above.

The invention proposes an optical fiber which has a large effective core area combined with chromatic dispersion comparable to that of prior art stepped index fibers. In this way the invention provides a fiber which can transmit high-power signals and in which non-linear effects are limited.

SUMMARY OF THE INVENTION

To be more precise, the invention proposes an optical fiber having, at a wavelength of 1 550 nm:

an effective core area not less than 100 $\mu$m$^2$, a chromatic dispersion not less than 14 ps/(nm.km), and a sensitivity to microcurvatures not greater than 1.

The fiber advantageously has a chromatic dispersion at a wavelength of 1 550 nm of not more than 21 ps/(nm.km).

The fiber can have an absolute chromatic dispersion slope at a wavelength of 1 550 nm not greater than 0.07 ps/(nm$^2$.km).

In one embodiment of the invention the fiber has curvature losses at a wavelength of 1 550 nm not greater than 0.05 dB and preferably less than 5×10$^{-4}$ dB.

In one embodiment of the invention the fiber has a coaxial+buried part index profile.

In another embodiment of the invention the fiber has a coaxial+ring index profile.

In another embodiment of the invention the fiber has a stepped+ring index profile.

The invention also proposes a wavelength-division multiplex fiber optic transmission system including fiber as defined above as line fiber. The system advantageously further includes dispersion compensating fiber.

Other features and advantages of the invention will become apparent on reading the following description of embodiments of the invention which is given by way of example only and with reference to the accompanying drawings.

DETAILED DESCRIPTION OF THE PREFERRED EMBODIMENTS

The invention proposes a fiber in which the effective core area is not less than 100 $\mu m^2$ and which has a chromatic dispersion at 1 550 nm of not less than 14 ps/(nm.km).

The invention therefore retains the technical advantages obtained using the prior art stepped index fiber and in particular the reduction in non-linear effects because of the high chromatic dispersion, which is typically greater than 14 ps/(nm.km).

It also has the advantage of a clear increase in the effective core area compared to that of the prior art stepped index fiber. The invention therefore provides a fiber which can transmit high-power signals and in which non-linear effects are limited.

The preferred specifications of the fiber according to the invention are as follows:

- effective core area not less than 100 $\mu m^2$ and preferably not less than 105 $\mu m^2$,
- chromatic dispersion not less than 14 ps/(nm.km) and preferably not greater than 21 ps/(nm.km),
- absolute chromatic dispersion slope at 1 550 nm less than 0.07 ps/($nm^2$.km), preferably about 0.06 ps/($nm^2$.km),
- sensitivity to microcurvatures at 1 550 nm not greater than 1,
- curvature losses at 1 550 nm not greater than 0.05 dB and preferably not greater than $5 \times 10^{-4}$ dB.

The curvature losses are measured using a prior art method which measures the losses induced in 100 turns of fiber wrapped around a 30 mm radius drum. The sensitivity to microcurvatures is measured relative to the ASMF 200 fiber. Prior art methods of measuring the sensitivity to microcurvatures can be used.

Figure 1:
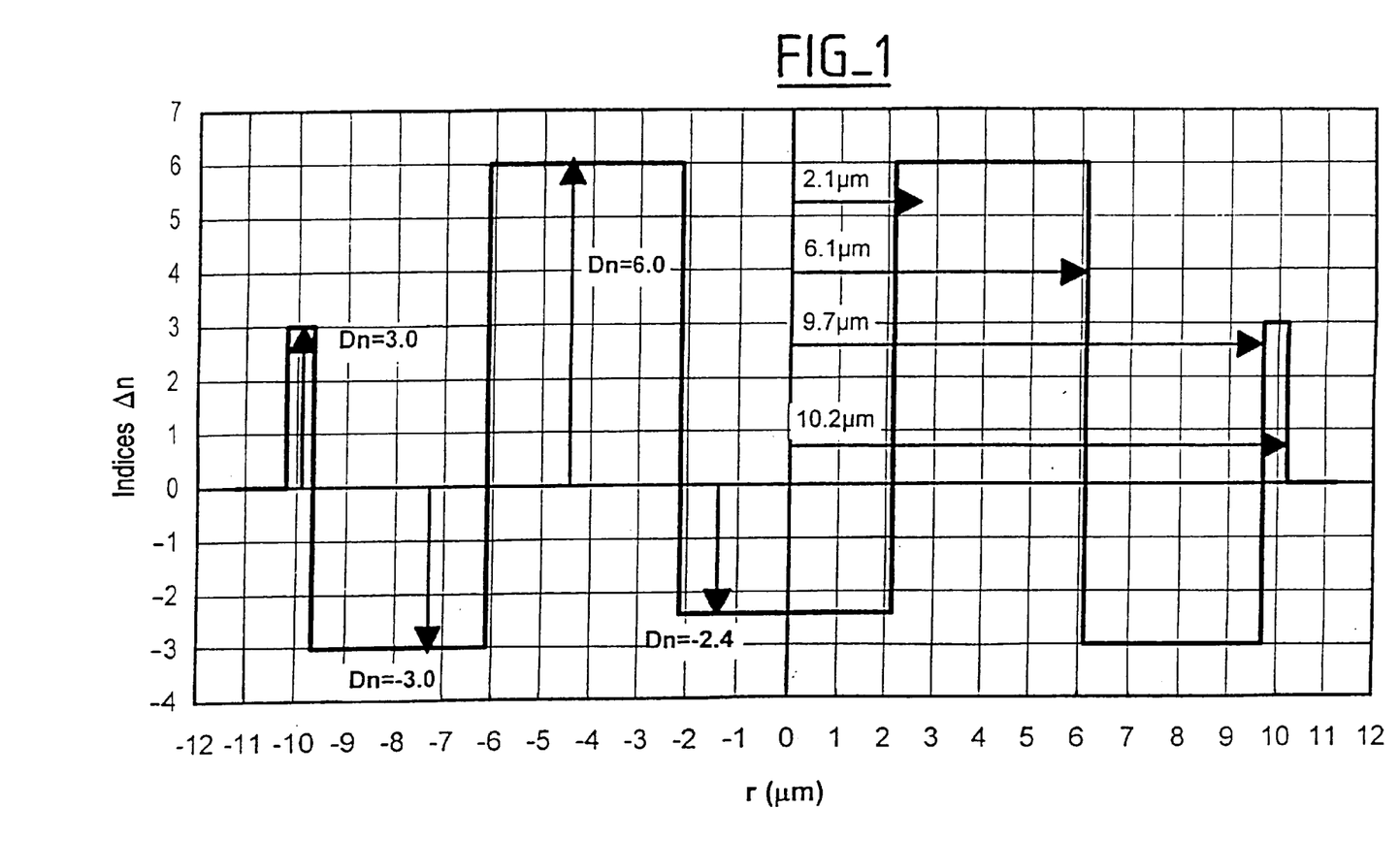
FIGS. 1 to 7 are diagrammatic representations of index profiles of different embodiments of a fiber according to the invention.
Figure 2:
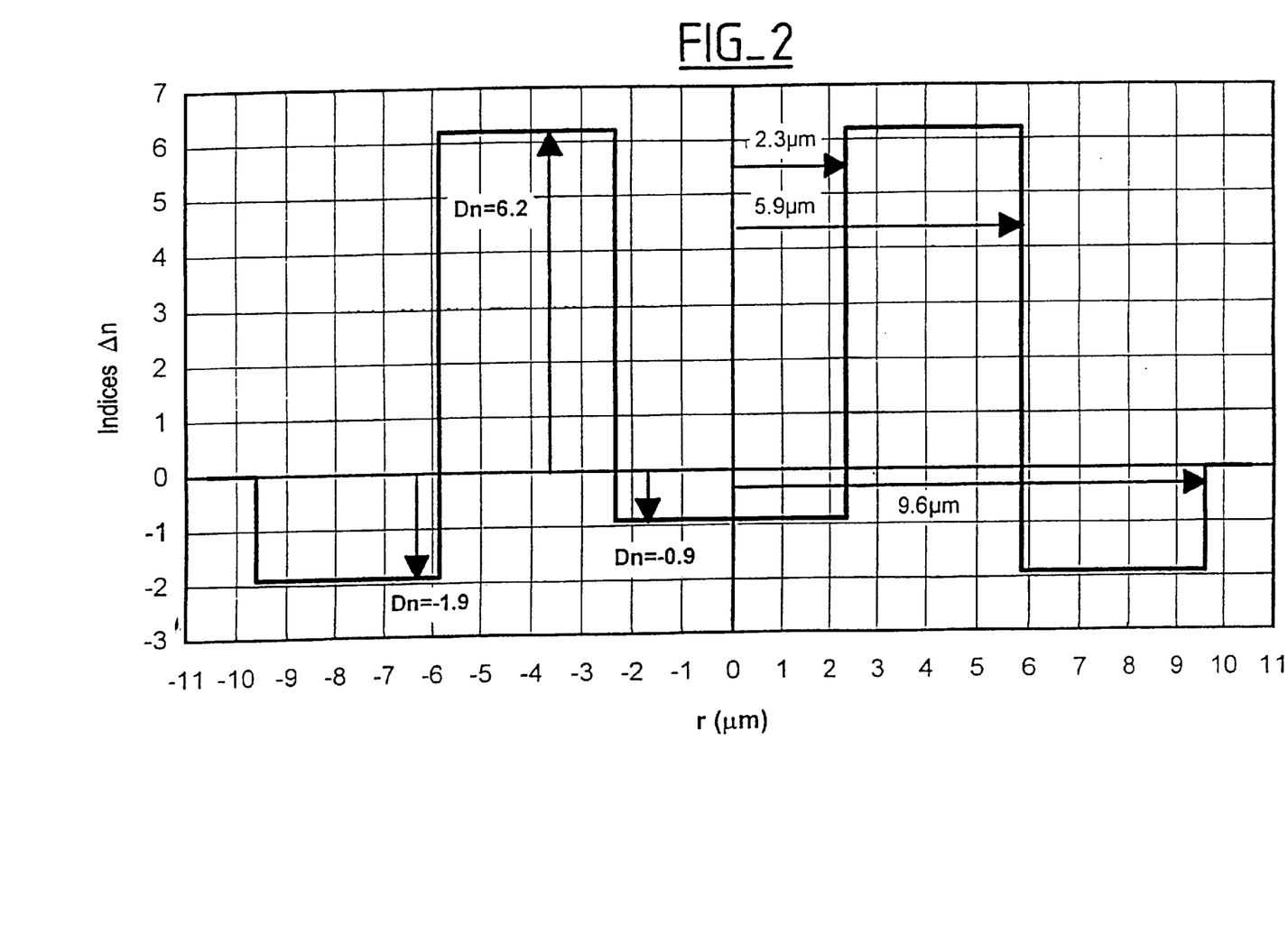
Figure 3:
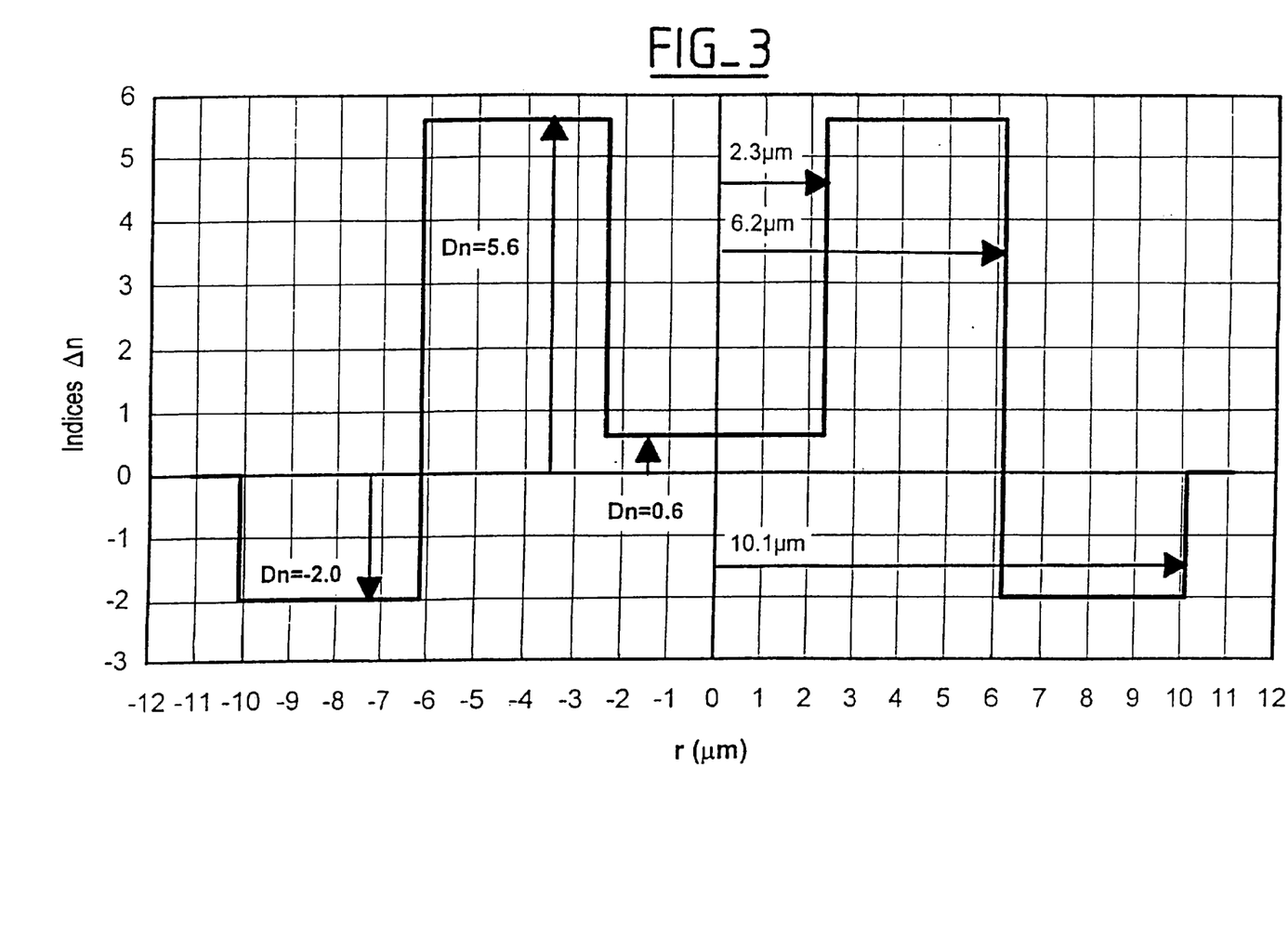
Figure 4:
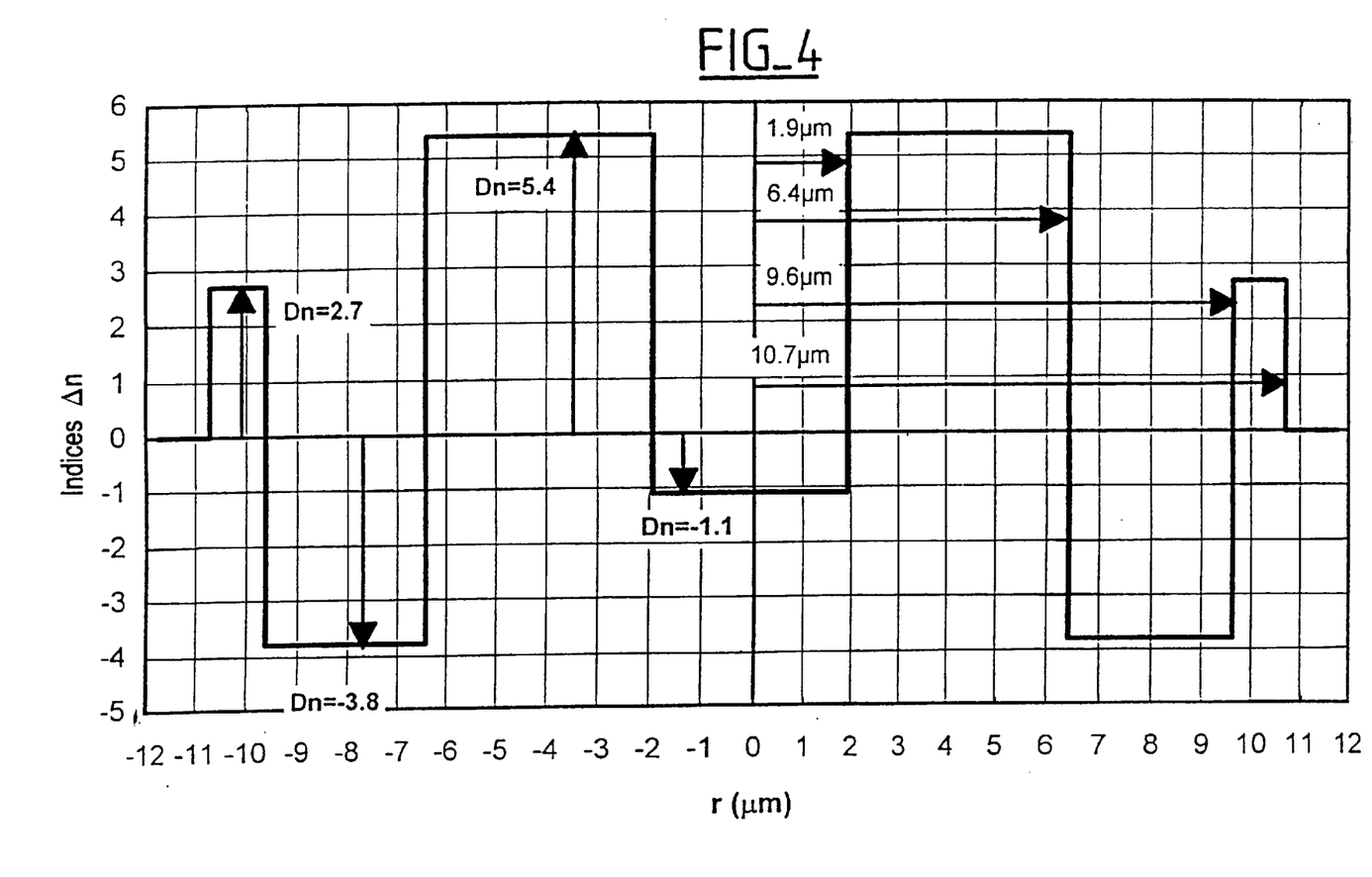
Figure 5:
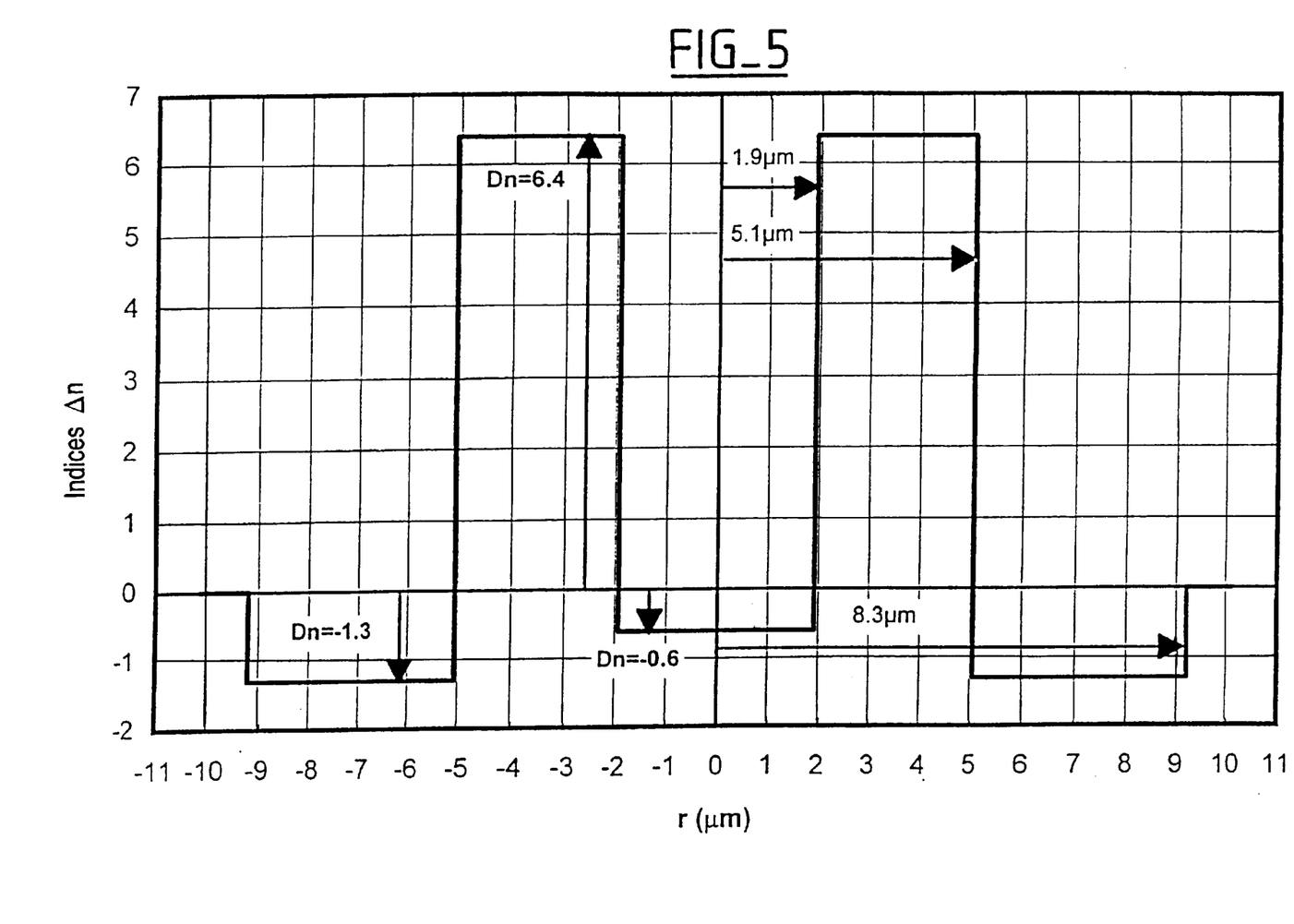
Figure 6:
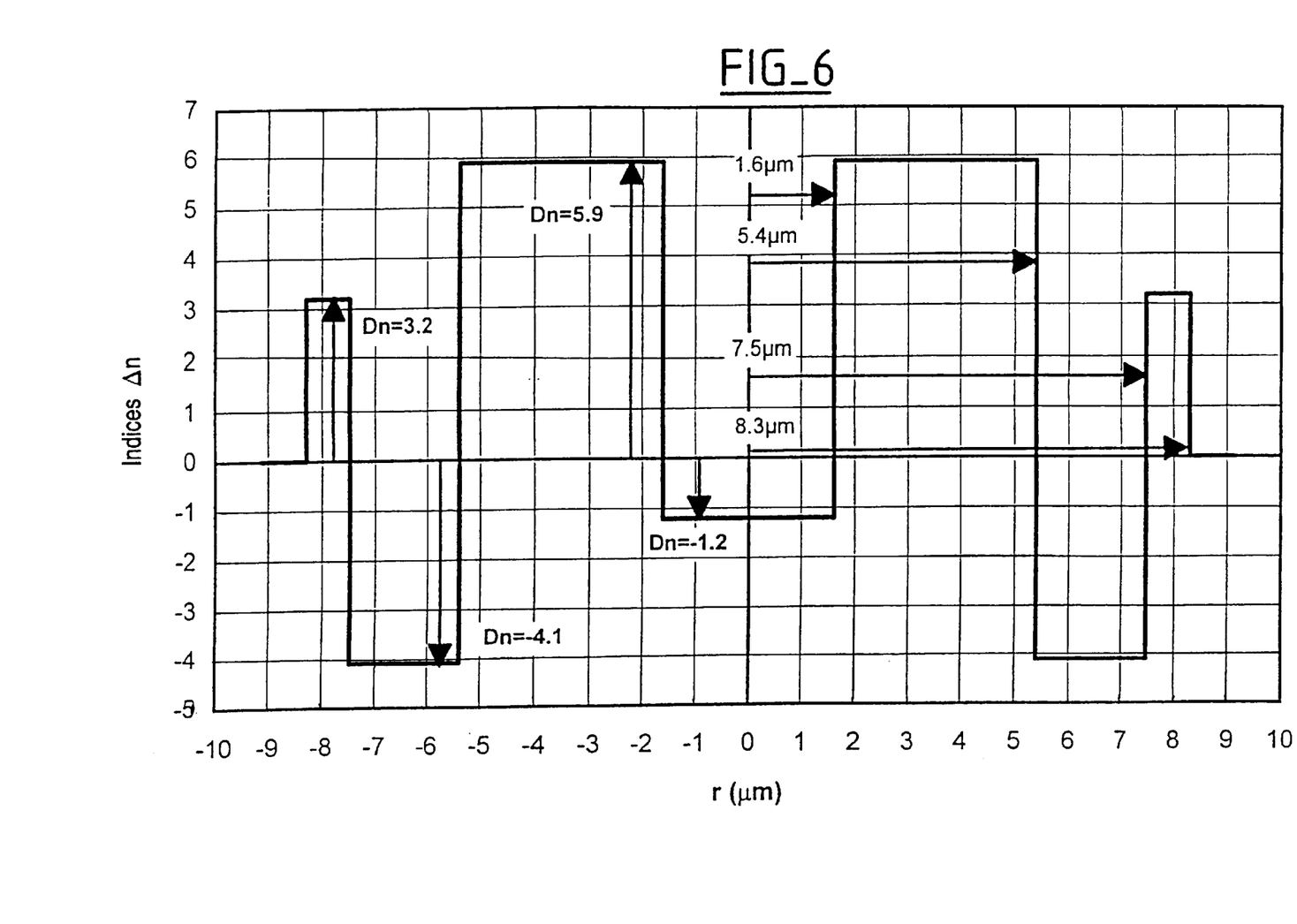
Figure 7:
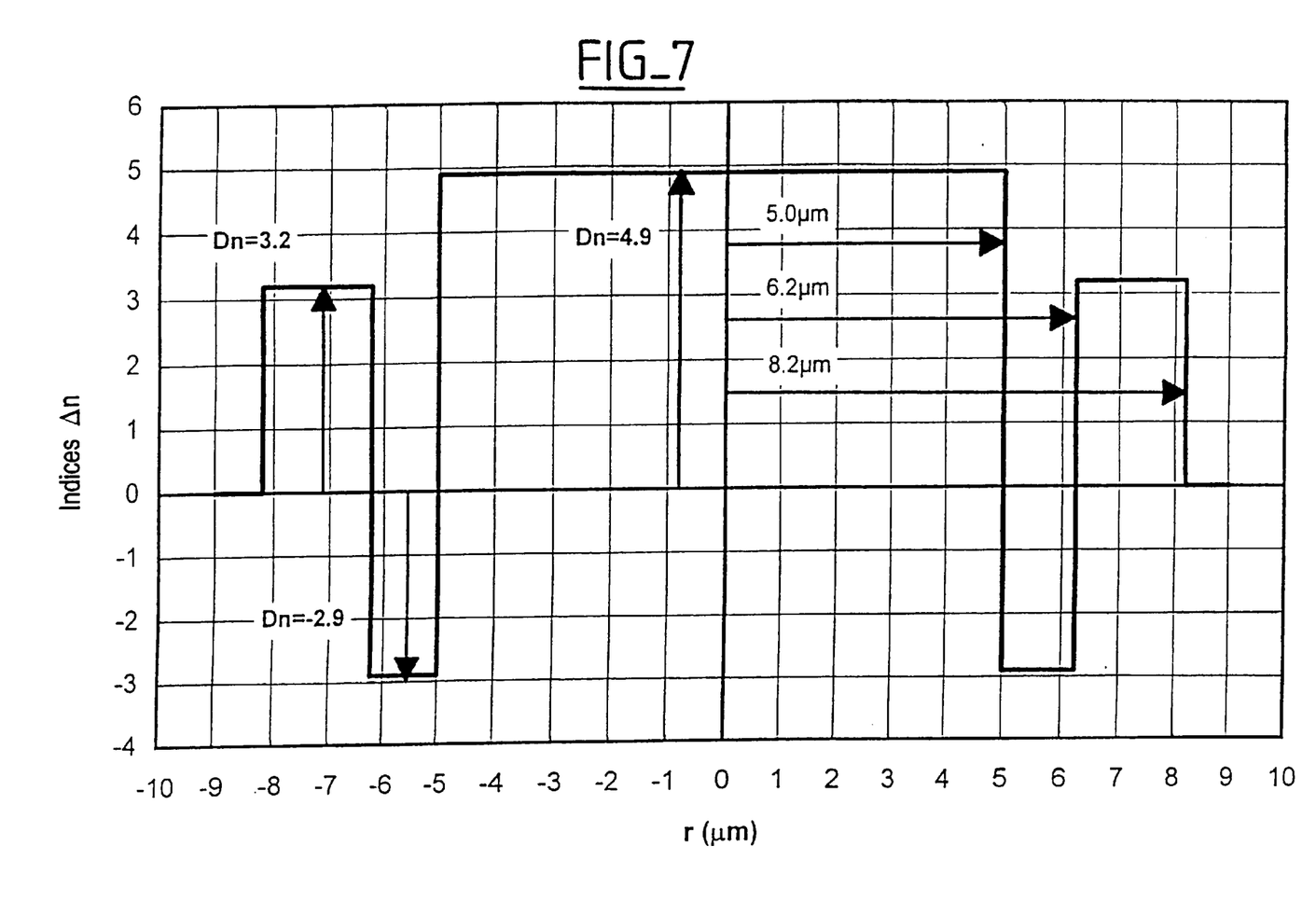

The remainder of the description with reference to the drawings describes examples of fiber profiles yielding the above values. FIGS. 1, 4 and 6 show examples of fibers with a coaxial+ring profile. FIGS. 2, 3 and 5 show examples of fibers with a coaxial+buried part profile. FIG. 7 shows an example of a fiber with a rectangular+ring profile or a stepped index+ring profile.

FIGS. 1, 4 and 6 are diagrammatic representations of the index profile of different fibers conforming to a first embodiment of the invention; in this embodiment the index profile is a coaxial+ring profile which has, starting from the center of the fiber:

- a central part of substantially constant index, and
- a first annular part having an index higher than the index of the cladding and higher than the index of the central part, the combination constituting a "coaxial" profile fiber.

The fiber has a buried part around the first annular part having an index less than or substantially equal to that of the cladding and a second annular part having an index higher than that of the cladding and forming a ring around the coaxial profile.

Index and radius values for the various examples shown in FIGS. 1, 4 and 6 are set out in the following table. The radii are in micrometers and the indices are to be multiplied by $10^{-3}$. The radii $r_1$, $r_2$, $r_3$ and $r_4$ are respectively the outside radii of the central part, the first annular part, the buried part and the second annular part. The indices $\Delta n_1$ to $\Delta n_4$ are respectively the differences between the index of the cladding of the fiber and the index of the central part, the first annular part, the buried part and the second annular part.

| | Radii | | | |
|---|---|---|---|---|
| | $r_1$ | $r_2$ | $r_3$ | $r_4$ |
| FIG. 1 | 2.1 | 6.1 | 9.7 | 10.2 |
| FIG. 4 | 1.9 | 6.4 | 9.6 | 10.7 |
| FIG. 6 | 1.6 | 5.4 | 7.5 | 8.3 |

| | Indices ($\times 10^{-3}$) | | | |
|---|---|---|---|---|
| | $66n_1$ | $\Delta n_2$ | $\Delta n_3$ | $\Delta n_4$ |
| FIG. 1 | 2.4 | 6.0 | -3.0 | 3.0 |
| FIG. 4 | -1.1 | 5.4 | -3.8 | 2.7 |
| FIG. 6 | -1.2 | 5.9 | -4.1 | 3.2 |

The various coaxial+ring profile embodiments produce fibers according to the invention with the specifications set out in the corresponding lines of the following table:

| $\lambda_{cth}$ (nm) | $\lambda_0$ (nm) | dC/d$\lambda$ ps/($nm^2$.km) | C ps/ (nm.km) | W02 ($\mu m$) | $S_{eff}$ ($\mu m^2$) | PC (dB) | $S_{\mu c}$ |
|---|---|---|---|---|---|---|---|
| 1710 | 1323 | 0.065 | 17.4 | 5.2 | 131 | $1.4 \times 10^{-4}$ | 1 |
| 1690 | 1299 | 0.063 | 19.4 | 5.4 | 131 | $1.3 \times 10^{-4}$ | 0.95 |
| 1540 | 1314 | 0.060 | 17.3 | 5.1 | 104 | $8.1 \times 10^{-4}$ | 1 |

In the table, $\lambda_{cth}$ is the theoretical cut-off wavelength of the fiber. In practice, the in-cable cut-off wavelength of the fiber is lower than this theoretical value, by 200 nm to 400 nm. Thus it can be seen that the examples of fibers according to the invention are always monomode fibers in a cable and at wavelengths in the usable range, for example from 1 530 nm to 1 630 nm. $\lambda_0$ is the chromatic dispersion cancellation wavelength. dC/d$\lambda$ is the chromatic dispersion slope expressed in ps/($nm^2$.km) measured at 1 550 nm. C is the chromatic dispersion expressed in ps/(nm.km) measured at 1 550 nm. $W_{02}$ is the mode radius, $S_{eff}$ the effective core area, PC the curvature losses and $S_{\mu c}$ the sensitivity to microcurvatures, all at 1 550 nm. Note that the fibers shown in FIGS. 1, 4 and 6 have the propagation characteristics of the invention.

Variations which retain the propagation characteristics of the invention are possible around the set point radius and index values given in the above tables and shown in FIGS. 1, 4 and 6. As a general rule, the radius can vary ±10% about the set point value. The index can vary ±0.5×$10^{-3}$ about the set point value.

FIGS. 2, 3 and 5 are diagrammatic representations of the index profile of fibers constituting a second embodiment of the invention. The profile in these figures is a coaxial+buried part profile. The fiber therefore has, starting from the center:

- a central part having a substantially constant index,
- an annular part having an index higher than the index of the cladding and higher than the index of the central part, and a buried part having an index lower than that of the cladding.

The index of the central part can be positive, as in the FIG. 3 example. It can instead be negative, as in the FIGS. 2 and 5 examples.

Index and radius values for the various examples of FIGS. 2, 3 and 5 are set out in the following table. The radii are in micrometers and the indices are to be multiplied by $10^{-3}$. The radii $r_1$, $r_2$ and $r_3$ are respectively the outside radii of the central part, the buried part and the annular part. The indices $\Delta n_1$ to $\Delta n_3$ are respectively the differences between the index of the cladding of the fiber and the index of the central part, the annular part and the buried part.

|  | $r_1$ | $r_2$ | $r_3$ | $\Delta n_1$ | $\Delta n_2$ | $\Delta n_3$ |
|---|---|---|---|---|---|---|
| FIG. 2 | 2.3 | 5.9 | 9.6 | −0.9 | 6.2 | −1.9 |
| FIG. 3 | 2.3 | 6.2 | 10.1 | 0.6 | 5.6 | −2.0 |
| FIG. 5 | 1.9 | 5.1 | 8.3 | −0.6 | 6.4 | −1.3 |

As in FIGS. 1, 4 and 6, variations about the above set point values are possible. A tolerance of ±10% for the radius values and ±0.5×$10^{-3}$ for the index values is appropriate.

These various coaxial+ring profile embodiments provide fibers according to the invention whose specifications are set out in the corresponding lines of the following table:

| $\lambda_{cth}$ (nm) | $\lambda_0$ (nm) | dC/dλ ps/(nm².km) | C ps/ (nm.km) | W02 (μm) | $S_{eff}$ (μm²) | PC (dB) | $S_{\mu c}$ |
|---|---|---|---|---|---|---|---|
| 1700 | 1326 | 0.065 | 17.4 | 5.3 | 130 | 1.4 × $10^{-4}$ | 0.99 |
| 1700 | 1303 | 0.064 | 19.4 | 5.6 | 133 | 1.0 × $10^{-4}$ | 0.95 |
| 1550 | 1322 | 0.064 | 17.4 | 5.1 | 107 | 3.8 × $10^{-4}$ | 0.96 |

Note that the fibers from FIGS. 2, 3 and 5 have the preferred propagation characteristics.

FIG. 7 shows an example of an index profile constituting a third embodiment of the invention. The FIG. 7 index profile is a rectangular+ring profile, also referred to as a stepped index+ring profile. Starting from the center, the fiber has:

a central part having an index higher than the index of the cladding, a buried part having an index lower than that of the cladding, an annular part having an index higher than the index of the cladding.

The outside radii $r_1$ to $r_3$ of these parts are:

$r_1$=5.0 μm, $r_2$=6.2 μm, $r_3$=8.2 μm.

The differences between the index of the cladding of the fiber and the index of the various parts are:

$\Delta n_1$=4.9×$10^{-3}$, $\Delta n_2$=−2.9×$10^{-3}$, $\Delta n_3$=3.2×$10^{-3}$.

Once again, the propagation characteristics of the invention can be obtained in ranges around the above set point values. As in the other embodiments, variations of ±10% around the set point radius values and variations of ±0.5× $10^{-3}$ around the index values are acceptable.

The above values produce a fiber having the following specifications:

theoretical cut-off wavelength $\lambda_{cth}$: 1 710 nm, chromatic dispersion cancellation wavelength $\lambda_0$: 1 310 nm, chromatic dispersion slope at 1 550 nm: 0.062 ps/ (nm².km), chromatic dispersion at 1 550 nm: 17.4 ps/(nm.km), mode radius $W_{02}$ at 1 550 nm: 5.7 μm, effective core area at 1 550 nm: 100 μm², attenuation due to curvatures: 3.3×$10^{-4}$ dB, sensitivity to microcurvatures at 1 550 nm: 0.91.

As in the previous embodiments, the fiber constituting the third embodiment has the preferred propagation characteristics of the invention.

Figure 8:
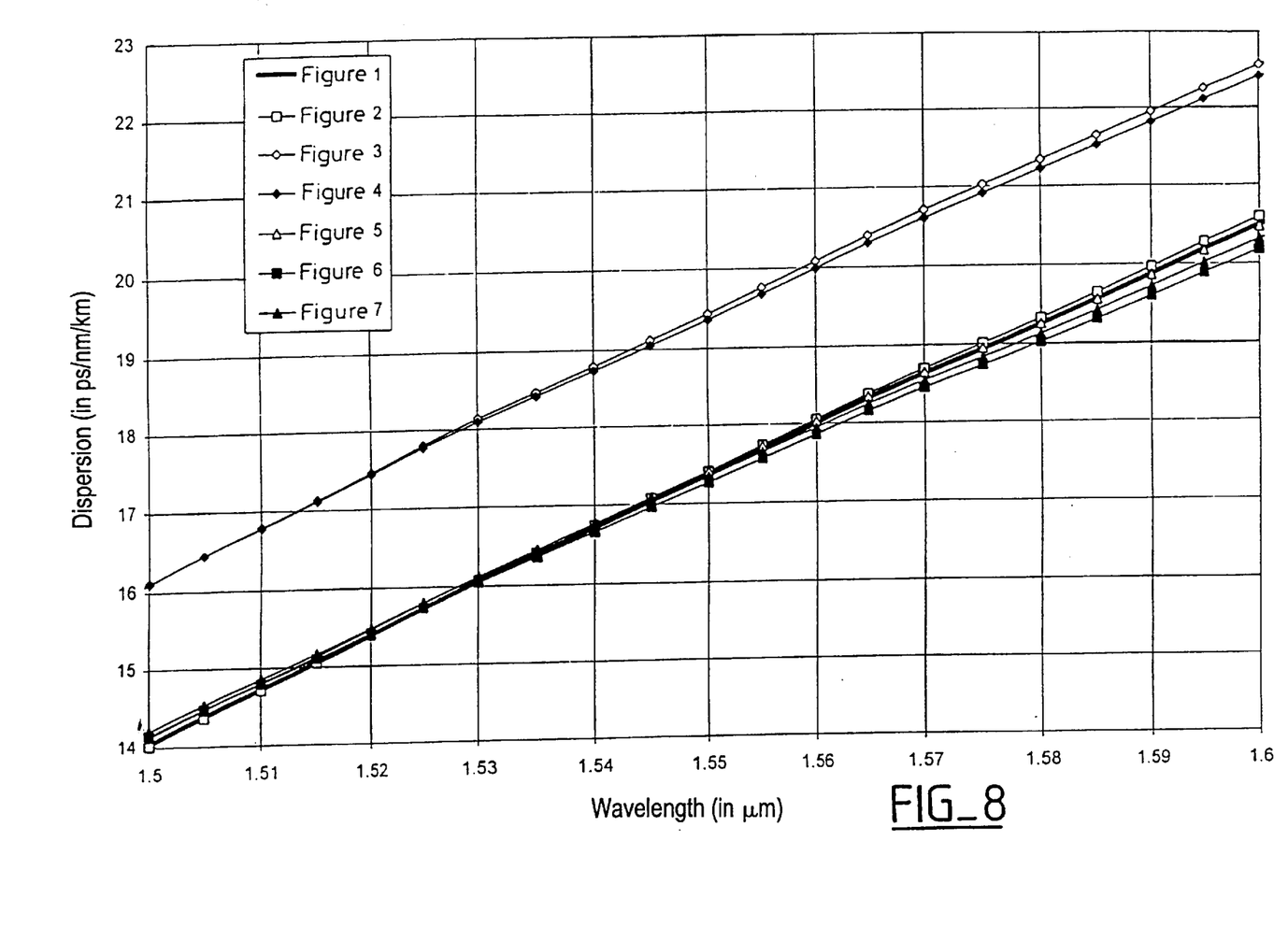
FIG. 8 is a graph of chromatic dispersion as a function of wavelength for the various embodiments of the invention.

FIG. 8 is a graph of dispersion as a function of wavelength for the various fibers according to the invention. The wavelength in μm from 1.5 μm to 1.6 μm is plotted on the ordinate axis. The chromatic dispersion in ps/(nm.km) at 1 550 nm is plotted on the abscissa axis. The figure shows the variations in dispersion as a function of wavelength for the various fibers described above. It shows that the chromatic dispersion is from 17 ps/(nm.km) to 20 ps/(nm.km) at 1 550 nm for all the fibers and from 14 ps/(nm.km) to 23 ps/(nm.km) at wavelengths from 1 500 nm to 1 600 nm for all the fibers described by way of example.

Figure 9:
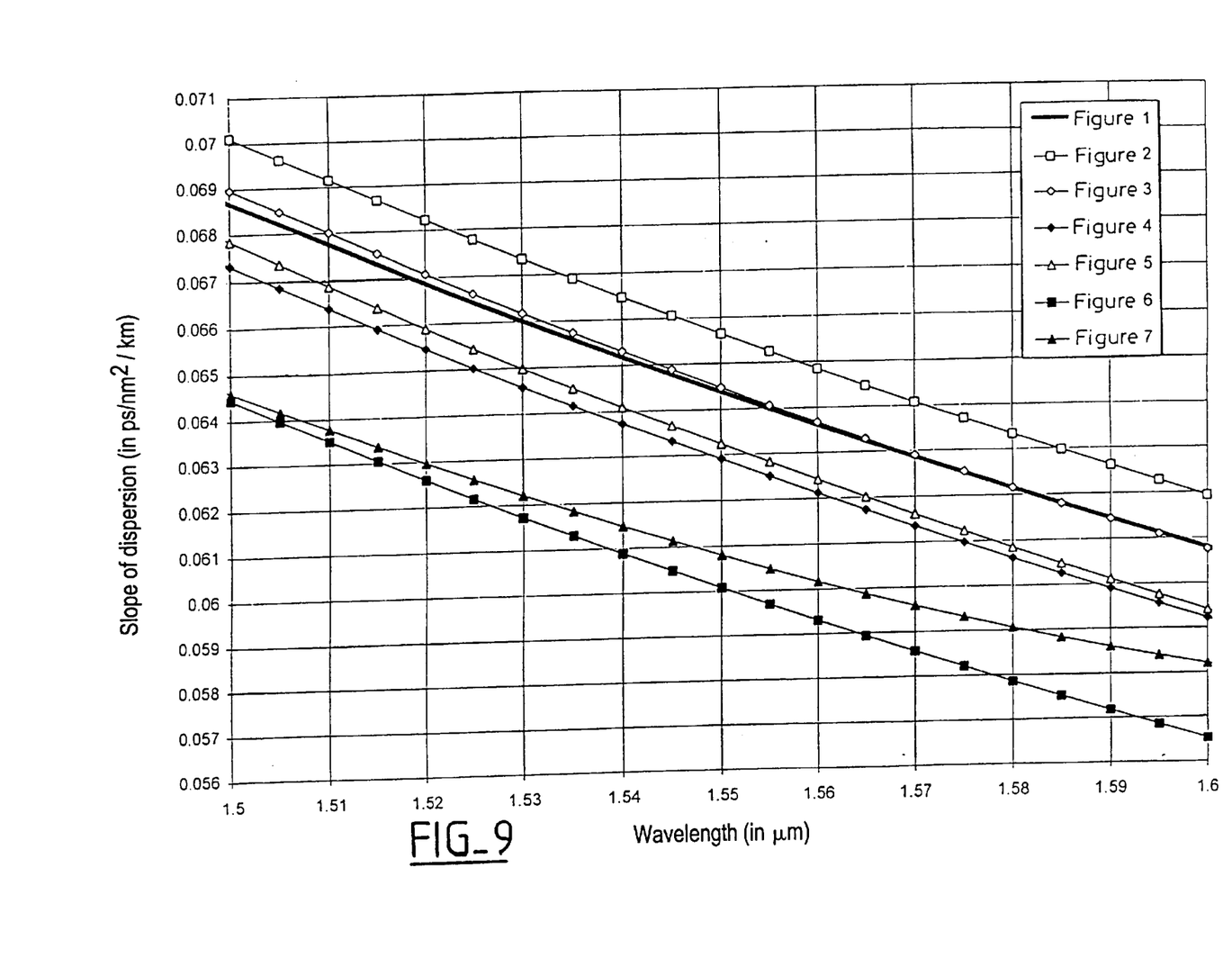
FIG. 9 is a graph of chromatic dispersion slope as a function of wavelength for the various embodiments of the invention.

FIG. 9 is a graph of dispersion slope as a function of wavelength for the various fibers described by way of example. The wavelength in micrometers is plotted on the abscissa axis and the chromatic dispersion slope in ps/ (nm².km) on the ordinate axis. The various curves give the variations in chromatic dispersion slope as a function of wavelength for the various fibers described above.

The figure shows that the chromatic dispersion slope at 1 550 nm is in all cases from 0.06 ps/(nm².km) to 0.066 ps/(nm².km). From 1 500 nm to 1 600 nm the chromatic dispersion slope of the various fibers of the invention is from 0.056 ps/(nm².km) to 0.07 ps/(nm².km).

The skilled person can fabricate the invention using techniques known in the art such as the MCVD technique or other techniques routinely used to fabricate optical fibers.

The invention applies in particular to the production of fiber optic transmission systems in which the fiber of the invention can be used as line fiber. Dispersion compensating fiber (DCF) can then also be included in the system.

Of course, the present invention is not limited to the examples and embodiments described and shown and is open to many variants that will be evident to the skilled person. It is obvious that the profiles of FIGS. 1 to 7 are given by way of example only and that other profiles can produce fibers having the features of the invention.

There is claimed:

1. An optical fiber having, at a wavelength of 1 550 nm: an effective core area not less than 100 μm², a chromatic dispersion not less than 14 ps/(nm.km), and a sensitivity to microcurvatures not greater than 1.

2. The fiber claimed in claim 1 having a chromatic dispersion at a wavelength of 1 550 nm of not more than 21 ps/(nm.km).

3. The fiber claimed in claim 1 having an absolute chromatic dispersion slope at a wavelength of 1 550 nm not greater than 0.07 ps/(nm².km).

4. The fiber claimed in claim 1 having curvature losses at a wavelength of 1 550 nm not greater than 0.05 dB and preferably less than 5×$10^{-4}$ dB.

5. The fiber claimed in claim 1 having an effective core area at a wavelength of 1 550 nm not less than 105 $\mu m^2$.

6. The fiber claimed in claim 1 having a coaxial index+buried part profile.

7. The fiber claimed in claim 1 having a coaxial+ring index profile.

8. The fiber claimed in claim 1 having a stepped+ring index profile.

9. A wavelength-division multiplex fiber optic transmission system including fiber as claimed in claim 1 as line fiber.

10. A system as claimed in claim 9 further including dispersion compensating fiber.

\* \* \* \* \*

UNITED STATES PATENT AND TRADEMARK OFFICE
CERTIFICATE OF CORRECTION

PATENT NO.    : 6,516,123 B1                                                             Page 1 of 1
DATED         : February 4, 2003
INVENTOR(S)   : Louis-Anne de Montmorillon and Pascale Nouchi It is certified that error appears in the above-identified patent and that said Letters Patent is hereby corrected as shown below:

<u>Title page,</u>
Item [75], should read:
-- [75] Inventor: Louis-Anne de Montmorillon, Paris (FR) and Pascale Nouchi, Maisons Lafitte (FR) --

Signed and Sealed this

Tenth Day of June, 2003

JAMES E. ROGAN
*Director of the United States Patent and Trademark Office*